United States Patent
Kim et al.

(10) Patent No.: US 10,189,085 B2
(45) Date of Patent: Jan. 29, 2019

(54) HOLLOW METAL PARTICLES, ELECTRODE CATALYST INCLUDING SAME, ELECTROCHEMICAL BATTERY INCLUDING THE ELECTRODE CATALYST, AND METHOD OF MANUFACTURING HOLLOW METAL PARTICLES

(71) Applicant: LG CHEM, LTD., Seoul (KR)

(72) Inventors: Sang Hoon Kim, Daejeon (KR); Gyo Hyun Hwang, Daejeon (KR); Jun Yeon Cho, Daejeon (KR); Kwanghyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 93 days.

(21) Appl. No.: 14/912,864

(22) PCT Filed: Nov. 28, 2014

(86) PCT No.: PCT/KR2014/011562
§ 371 (c)(1),
(2) Date: Feb. 18, 2016

(87) PCT Pub. No.: WO2015/080518
PCT Pub. Date: Jun. 4, 2015

(65) Prior Publication Data
US 2016/0204448 A1    Jul. 14, 2016

(30) Foreign Application Priority Data
Nov. 28, 2013  (KR) .................. 10-2013-0146207

(51) Int. Cl.
*B22F 1/02*        (2006.01)
*H01M 4/86*      (2006.01)
(Continued)

(52) U.S. Cl.
CPC ............ *B22F 1/025* (2013.01); *B22F 1/0051* (2013.01); *B22F 9/24* (2013.01); *H01M 4/8652* (2013.01);
(Continued)

(58) Field of Classification Search
None
See application file for complete search history.

(56) References Cited

U.S. PATENT DOCUMENTS

2005/0106096 A1    5/2005   Hong et al.
2008/0029396 A1    2/2008   Shirakura et al.
(Continued)

FOREIGN PATENT DOCUMENTS

EP    0556535 A1    8/1993
JP    04141235 A    5/1992
(Continued)

OTHER PUBLICATIONS

Ge Chen et al : "Facile Synthesis of Co-Pt Hollow Sphere Electrocatalyst", Chemistry of Materials, vol. 19, No. 7, Apr. 1, 2007, pp. 1840-1844.
(Continued)

*Primary Examiner* — Wyatt P McConnell
(74) *Attorney, Agent, or Firm* — Dentons US LLP

(57) ABSTRACT

The present specification relates to a hollow metal particle, an electrode catalyst including the same, an electrochemical battery including the electrode catalyst, and a method of manufacturing the hollow metal particle.

16 Claims, 3 Drawing Sheets

(51) Int. Cl.
*B22F 9/24* (2006.01)
*B22F 1/00* (2006.01)
*H01M 4/92* (2006.01)
*H01M 8/1018* (2016.01)

(52) U.S. Cl.
CPC ......... *H01M 4/8657* (2013.01); *H01M 4/921* (2013.01); *H01M 4/928* (2013.01); *H01M 2008/1095* (2013.01)

(56) References Cited

U.S. PATENT DOCUMENTS

| | | |
|---|---|---|
| 2010/0086832 A1 | 4/2010 | Lopez et al. |
| 2012/0015211 A1 | 1/2012 | Gu et al. |
| 2013/0059231 A1 | 3/2013 | Hwang et al. |
| 2013/0177838 A1 | 7/2013 | Wang et al. |
| 2014/0308537 A1 | 10/2014 | Cho et al. |
| 2014/0342157 A1 | 11/2014 | Kim et al. |
| 2015/0037711 A1 | 2/2015 | Cho et al. |
| 2015/0118496 A1 | 4/2015 | Cho et al. |

FOREIGN PATENT DOCUMENTS

| | | |
|---|---|---|
| JP | 2001-115144 A | 4/2001 |
| JP | 2004-131780 A | 4/2004 |
| JP | 2005330575 | 12/2005 |
| JP | 2008274350 | 11/2008 |
| JP | 2011-101941 A | 5/2011 |
| JP | 2012-200660 A | 10/2012 |
| JP | 2013-536065 A | 9/2013 |
| KR | 10-2003-0059725 A | 7/2003 |
| KR | 10-2009-0049613 A | 5/2009 |
| KR | 10-2013-0026273 A | 3/2013 |
| KR | 10-2013-0028161 A | 3/2013 |
| KR | 10-2013-0126539 A | 11/2013 |
| KR | 10-2013-0126541 A | 11/2013 |
| WO | 2013/162234 A1 | 10/2013 |
| WO | 2013169078 | 11/2013 |

OTHER PUBLICATIONS

"Supportless oxygen reduction electrocatalysts of CoCuPt hollow nanoparticles"; Wu, et al; Phil. Trans. R. Soc. A (2010) 368, 4261-4274.

Zhao et al., "Facile preparation and excellent catalytic performance of PtRuPd hollow spheres nanoelectrocatalysts," Materials Chemistry and Physics. 115 (2): 831-834 (2009).

Chinese master's Theses Full-Text Database Engineering Science and Technology II, No. 9, C042-206. (English translation of abstract attached).

[Figure 1]
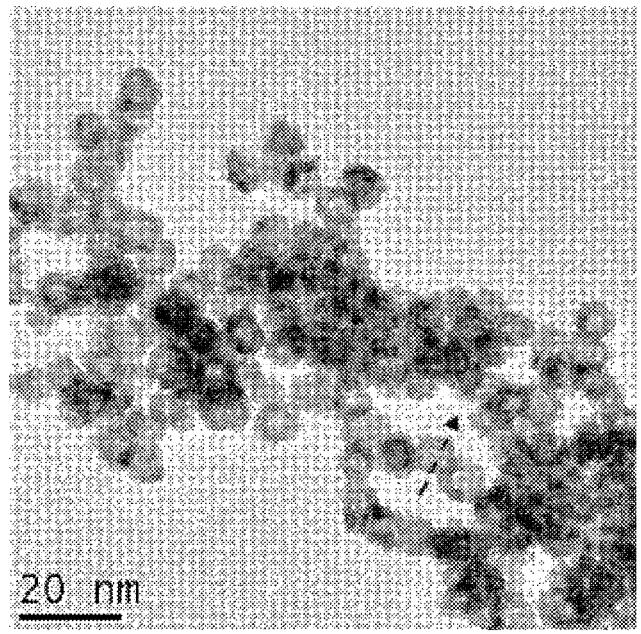
[Figure 2]
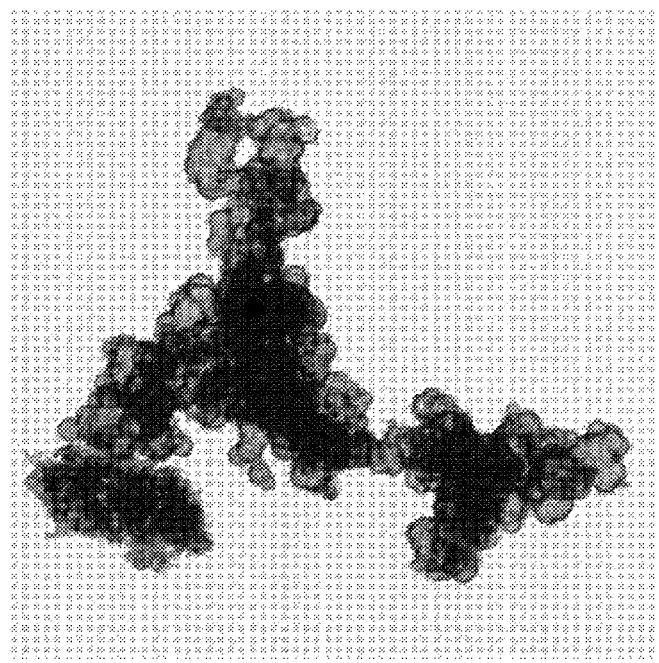

[Figure 3]
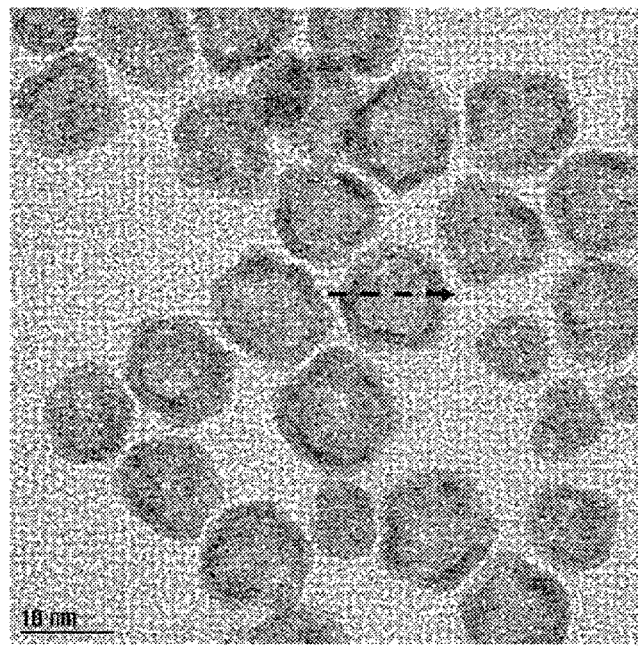
[Figure 4]
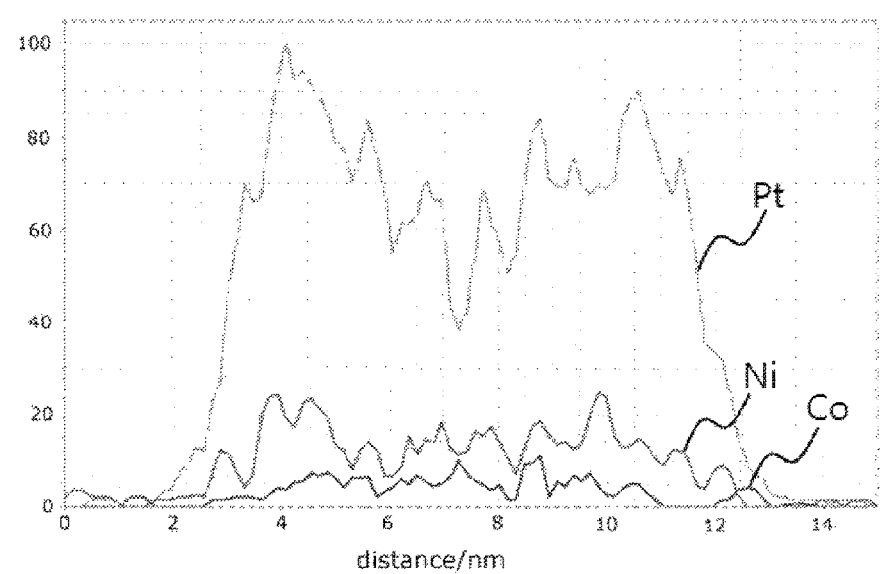
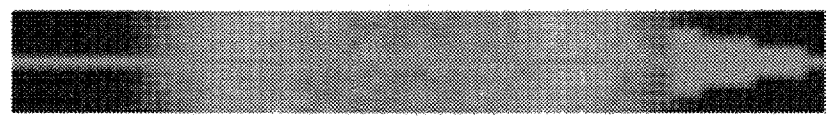

[Figure 5]
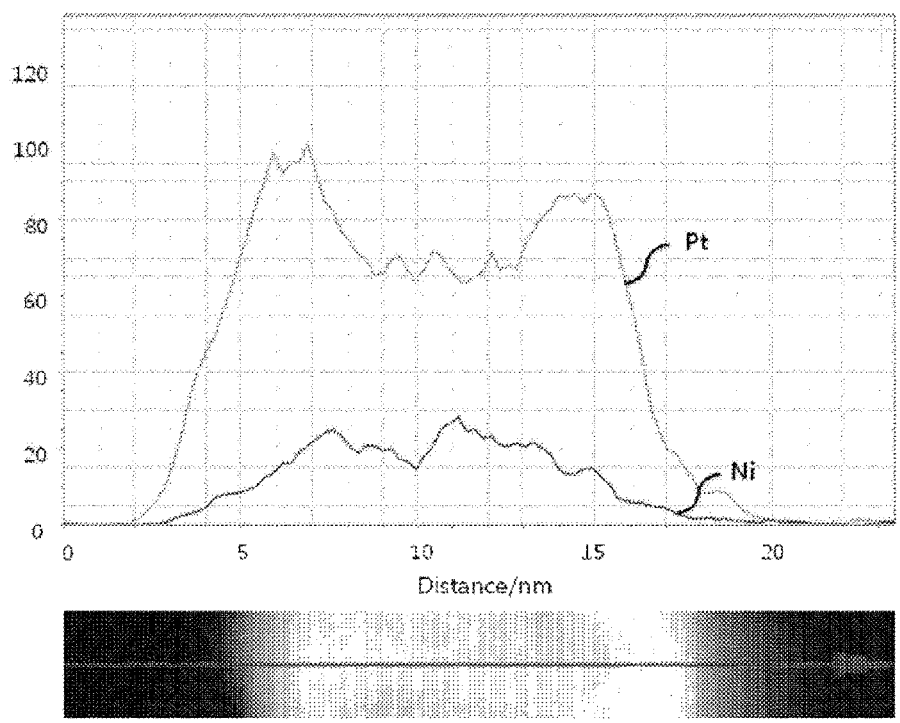

HOLLOW METAL PARTICLES, ELECTRODE CATALYST INCLUDING SAME, ELECTROCHEMICAL BATTERY INCLUDING THE ELECTRODE CATALYST, AND METHOD OF MANUFACTURING HOLLOW METAL PARTICLES

This application is a National Stage Application of International Application No. PCT/KR2014/011562, filed on Nov. 28, 2014, which claims the benefit of Korean Patent Application No. 10-2013-0146207, filed on Nov. 28, 2013, all of which are hereby incorporated by reference in their entirety for all purposes as if fully set forth herein.

TECHNICAL FIELD

This application claims priority to and the benefit of Korean Patent Application No. 10-2013-0146207 filed in the Korean Intellectual Property Office on Nov. 28, 2013, the entire contents of which are incorporated herein by reference.

The present specification relates to a hollow metal particle, an electrode catalyst including the same, an electrochemical battery including the electrode catalyst, and a method of manufacturing the hollow metal particle.

BACKGROUND ART

Nano-particles are particles having a nano-scale particle size, and exhibit a quantum confinement effect where energy required for electron transference is changed according to a size of a material, and optical, electric, and magnetic properties that are entirely different from those of a material in a bulk state due to a wide specific surface area. Accordingly, great interest has focused on availability thereof in catalyst, electric and magnetic, optical, and medical fields because of the aforementioned properties. The nano-particles may be said to be an intermediate between a bulk and a molecule, and can be synthesized in view of approaching methods in two directions, that is, a "Top-down" approaching method and a "Bottom-up" approaching method.

Examples of a method of synthesizing metal nano-particles include a method of reducing metal ions on a solution by a reducing agent, a method using a gamma ray, an electrochemical method, and the like, but in the existing methods, since it is difficult to synthesize nano-particles having a uniform size and shape or an organic solvent is used, problems such as environmental pollution and high costs occur, and thus it is difficult to perform mass production economically. Therefore, there is a demand for development of high-quality nano-particles having a uniform size.

DETAILED DESCRIPTION OF THE INVENTION

Technical Problem

The present specification has been made in an effort to provide a hollow metal particle, an electrode catalyst including the same, an electrochemical battery including the electrode catalyst, and a method of manufacturing the hollow metal particle.

Technical Solution

An exemplary embodiment of the present specification provides a hollow metal particle including: a hollow core portion; and a metal shell including a first metal, a second metal, and a third metal, in which the second metal and the third metal each include a metal having a standard reduction potential that is lower than a standard reduction potential of the first metal.

Another exemplary embodiment of the present specification provides an electrode catalyst including the hollow metal particle.

Yet another exemplary embodiment of the present specification provides an electrochemical battery including the electrode catalyst.

Still another exemplary embodiment of the present specification provides a method of manufacturing a hollow metal particle, including: forming a hollow core portion; and a metal shell including a first metal, a second metal, and a third metal, in which the second metal and the third metal each include a metal having a standard reduction potential that is lower than a standard reduction potential of the first metal.

Advantageous Effects

The present specification can provide particles having a uniform size to apply the particles to various fields.

BRIEF DESCRIPTION OF DRAWINGS

FIG. 1 is a transmission electron microscopy (TEM) picture of a hollow metal particle manufactured in Example 1.

FIG. 2 is a TEM picture of a hollow metal particle manufactured in Example 2.

FIG. 3 is a TEM picture of a hollow metal particle manufactured in Comparative Example 1.

FIG. 4 illustrates an analysis result of an atomic percent of an element positioned along a line of an arrow in the hollow metal particle of FIG. 1 by an EDS line profile.

FIG. 5 illustrates an analysis result of an atomic percent of an element positioned along a line of an arrow in the hollow metal particle of FIG. 3 by an EDS line profile.

BEST MODE

Hereinafter, the present specification will be described in detail.

The present specification provides a hollow metal particle including a hollow core portion; and a metal shell including a first metal, a second metal, and a third metal.

The hollow core portion may include a material where the core portion of the hollow metal particle is hollow, or a material other than a metal.

In the case where the hollow core portion includes the material other than the metal, for example, a surfactant may be included.

In the exemplary embodiment of the present specification, the surfactant may include two kinds or more.

In the exemplary embodiment of the present specification, two kinds or more surfactants may include two kinds or more of a cation surfactant, an anion surfactant, and a non-ionic surfactant.

In the case where the surfactant includes one kind or more cation surfactants and one kind or more anion surfactants, a mole ratio of the cation surfactant may be 0.1 or more and 0.4 or less based on a mole number of the anion surfactant. In this case, stability of a micelle generated by the surfactant is increased.

The first metal may include at least one of precious metal-based metals. Specifically, the first metal may include at least one of platinum (Pt), ruthenium (Ru), rhodium (Rh), osmium (Os), iridium (Ir), palladium (Pd), gold (Au), and silver (Ag). If necessary, the first metal may include platinum.

The second metal and the third metal may each include at least one of transition metals having a standard reduction potential that is lower than that of the precious metal-based metals.

In the case where the first metal includes platinum, the second metal and the third metal may each include at least one of the transition metals having the standard reduction potential that is lower than that of platinum.

The transition metals having the standard reduction potential that is lower than that of the precious metal-based metals may include nickel (Ni), cobalt (Co), iron (Fe), copper (Cu), and the like.

Nickel, cobalt, iron, and copper are a metal having high oxygen reduction reactivity among the transition metals.

Oxygen reduction reactivity of a metal where at least one of nickel, cobalt, iron, and copper is alloyed with at least one of the precious metal-based metals may be higher than individual oxygen reduction reactivity of the precious metal-based metals.

Oxygen reduction reactivity of the metal where at least one of nickel, cobalt, iron, and copper is alloyed with at least one of platinum, ruthenium, rhodium, osmium, iridium, palladium, gold, and silver may be higher than individual oxygen reduction reactivity of the precious metal-based metals such as platinum, ruthenium, rhodium, osmium, iridium, palladium, gold, and silver.

Oxygen reduction reactivity of the metal where at least one of nickel, cobalt, iron, and copper is alloyed with platinum may be higher than individual oxygen reduction reactivity of platinum.

Oxygen reduction reactivity of the metal where two or more of nickel, cobalt, iron, and copper are alloyed with platinum may be higher than individual oxygen reduction reactivity of platinum.

Oxygen reduction reactivity of the metal where two kinds of metals of nickel, cobalt, iron, and copper are alloyed with platinum may be higher than individual oxygen reduction reactivity of platinum.

The second metal and the third metal may be each independently nickel (Ni) or cobalt (Co).

When a sum of mole numbers of the first metal, the second metal, and the third metal is 1, a mole ratio of the first metal may be 0.6 or more and 0.9 or less.

When the sum of the mole numbers of the first metal, the second metal, and the third metal is 1, a mole ratio of the sum of the mole numbers of the second metal and the third metal may be 0.1 or more and 0.4 or less.

The first metal is obtained by reducing a first metal precursor, the second metal is obtained by reducing a second metal precursor, the third metal is obtained by reducing a third metal precursor, and the mole ratio of the first metal precursor and the second metal precursor may be 1:0.5 to 3. In this case, the hollow particle is well generated.

The mole ratio of the first metal precursor and the third metal precursor may be 1:0.5 to 3. In this case, the hollow particle is well generated.

The metal shell of the present specification may be formed of the first metal, the second metal, and the third metal. That is, the metal shell may have a three component system metal, and the hollow metal particle of the present specification may be a three component system hollow metal particle formed of three kinds of metals.

A size of the hollow metal particle may be 20 nm or less.

An average of the sizes of the hollow metal particles may be 10 nm or less.

A deviation from the average of the sizes of the hollow metal particles may be 3 nm or less. In this case, as compared to an existing nano-particle, the hollow metal particles are small and uniform and have an increased specific surface area, and thus may exhibit excellent activity.

For example, the case where the average of the sizes of the hollow metal particles is 10 nm and the deviation thereof is 3 nm means that the hollow metal particles are distributed in size of 7 nm or more and 13 nm or less.

The present specification provides an electrode catalyst including the hollow metal particle.

The catalyst means a material that has an increase or decrease effect of a reaction speed and can exist in an original state after a reaction is finished.

In the present specification, the electrode catalyst may be a positive catalyst increasing the reaction speed, and specifically, may be a positive catalyst increasing a speed of an oxidation or reduction reaction in a cell.

The electrode catalyst may be a fuel cell catalyst, and specifically, may be a catalyst for an oxygen reduction reaction in a fuel cell.

The present specification provides an electrochemical battery including the electrode catalyst.

The electrochemical battery is a cell converting chemical energy into electric energy through a chemical reaction of a material, and a kind of the electrochemical battery is not particularly limited as long as the electrochemical battery is a cell converting chemical energy into electric energy.

The electrochemical battery may be any one of a primary cell, a secondary cell, a storage cell, and the fuel cell.

The kind of the electrochemical battery including the electrode catalyst is not particularly limited, but the electrochemical battery may be the secondary cell or the fuel cell, for example, a polymer electrolyte membrane fuel cell.

The present specification provides a method of manufacturing a hollow metal particle, including forming a hollow core portion; and a metal shell including a first metal, a second metal, and a third metal.

The hollow core portion, the first metal, the second metal, the third metal, the metal shell, and the surfactant as will be described later are the same as those described in the hollow metal particle.

In the exemplary embodiment of the present specification, the forming of the hollow core portion and the metal shell may include forming the metal shell including the first metal, the second metal, and the third metal on a surface of a micelle formed of a surfactant.

In the exemplary embodiment of the present specification, the forming of the hollow core portion and the metal shell may include forming the metal shell including the first metal, the second metal, and the third metal on the surface of the micelle formed of a surfactant; and washing the particle in which the hollow core portion and the metal shell are formed after the metal shell is formed.

In the washing, the particle may be washed by water or alcohol.

In the exemplary embodiment of the present specification, the method may further include, after the metal shell is formed, removing the micelle.

In the exemplary embodiment of the present specification, the forming of the metal shell on the surface of the micelle may include stirring a solution including a surfactant, a first metal precursor, a second metal precursor, a third metal precursor, and a solvent; and adding a reducing agent to the solution to reduce the first metal precursor, the second metal precursor, and the third metal precursor.

The kinds of the first metal precursor, the second metal precursor, and the third metal precursor are not limited, but the first metal precursor is a salt including a first metal ion or an atom group ion including the first metal ion and may serve to provide the first metal. The second metal precursor is a salt including a second metal ion or an atom group ion including the second metal ion and may serve to provide the second metal. Further, the third metal precursor is a salt including a third metal ion or an atom group ion including the third metal ion and may serve to provide the third metal.

In the exemplary embodiment of the present specification, the solvent may be water.

In the exemplary embodiment of the present specification, in the case where water is selected as the solvent, in the solution, a concentration of the surfactant may be 0.5 times or more and 5 times or less of a critical micelle concentration (CMC) to water.

If the concentration of the surfactant is less than 0.5 times of the critical micelle concentration, the concentration of the surfactant adsorbed on a metal salt may be relatively reduced. Accordingly, an amount of the surfactant forming the core may be entirely reduced. Meanwhile, if the concentration of the surfactant is more than 5 times of the critical micelle concentration, the concentration of the surfactant is relatively increased, and thus the surfactant forming the hollow core and the metal particle not forming the hollow core may be mixed to be aggregated.

According to the exemplary embodiment of the present specification, the size of the hollow metal particle may be adjusted by a chain length of the surfactant forming the micelle. Specifically, if the chain length of the surfactant is short, since the size of the micelle is reduced, a hollow size is reduced, and thus the size of the hollow metal particle may be reduced.

According to the exemplary embodiment of the present specification, the number of carbon atoms of a chain of the surfactant may be 16 or less. Specifically, the number of carbon atoms of the chain may be 8 or more and 16 or less. Alternatively, the number of carbon atoms of the chain may be 10 or more and 12 or less.

In the exemplary embodiment of the present specification, two kinds or more surfactants may be provided.

In the exemplary embodiment of the present specification, two kinds or more surfactants may include two kinds or more of the cation surfactant, the anion surfactant, and the non-ionic surfactant.

In the case where the surfactant includes one kind or more cation surfactants and one kind or more anion surfactants, the mole ratio of the cation surfactant may be 0.1 or more and 0.4 or less based on the mole number of the anion surfactant. In this case, stability of the micelle generated by the surfactant is increased.

The anion surfactant is not particularly limited, but for example, the anion surfactant may be selected from the group consisting of potassium laurate, triethanolamine stearate, ammonium lauryl sulfate, lithium dodecyl sulfate, sodium lauryl sulfate, sodium dodecyl sulfate, alkyl polyoxyethylene sulfate, sodium alginate, dioctyl sodium sulfosuccinate, phosphatidyl glycerol, phosphatidyl inositol, phosphatidyl serine, phosphatidic acid and a salt thereof, glyceryl ester, sodium carboxymethylcellulose, bile acid and a salt thereof, cholic acid, deoxycholic acid, glycocholic acid, taurocholic acid, glycodeoxycholic acid, alkyl sulfonate, aryl sulfonate, alkyl phosphate, alkyl phosphonate, stearic acid and a salt thereof, calcium stearate, phosphate, dioctyl sulfosuccinate, dialkylester of sodium sulfosuccinate, phospholipid, and calcium carboxymethylcellulose.

The cation surfactant is not particularly limited, but for example, the cation surfactant may be selected from the group consisting of a quaternary ammonium compound, benzalkonium chloride, cetyltrimethylammonium bromide, chitosan, lauryldimethylbenzylammonium chloride, acyl carnitine hydrochloride, alkylpyridinium halide, cetyl pyridinium chloride, cationic lipid, polymethyl methacrylate trimethylammonium bromide, a sulfonium compound, polyvinylpyrrolidone-2-dimethylaminoethyl methacrylate dimethyl sulfate, hexadecyltrimethyl ammonium bromide, a phosphonium compound, benzyl-di(2-chloroethyl)ethylammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethyl hydroxyethyl ammonium chloride bromide, $C_{12}$-$C_{15}$-dimethyl hydroxyethyl ammonium chloride, $C_{12}$-$C_{15}$-dimethyl hydroxyethyl ammonium chloride bromide, coconut dimethyl hydroxyethyl ammonium chloride, coconut dimethyl hydroxyethyl ammonium bromide, myristyl trimethyl ammonium methylsulfate, lauryl dimethyl benzyl ammonium chloride, lauryl dimethyl benzyl ammonium bromide, lauryl dimethyl (ethenoxy) 4 ammonium chloride, lauryl dimethyl (ethenoxy) 4 ammonium bromide, N-alkyl ($C_{12}$-$C_{18}$)dimethylbenzyl ammonium chloride, N-alkyl ($C_{14}$-$C_{18}$)dimethyl-benzyl ammonium chloride, N-tetradecyldimethylbenzyl ammonium chloride monohydrate, dimethyl didecyl ammonium chloride, N-alkyl ($C_{12}$-$C_{14}$)dimethyl 1-naphthylmethyl ammonium chloride, a trimethylammonium halide alkyl-trimethylammonium salt, a dialkyl-dimethylammonium salt, lauryl trimethyl ammonium chloride, an ethoxylated alkylamidoalkyldialkylammonium salt, an ethoxylated trialkylammonium salt, dialkylbenzene dialkylammonium chloride, N-didecyldimethyl ammonium chloride, N-tetradecyldimethylbenzyl ammonium chloride monohydrate, N-alkyl($C_{12}$-$C_{14}$) dimethyl 1-naphthylmethyl ammonium chloride, dodecyldimethylbenzyl ammonium chloride, dialkyl benzene-alkyl ammonium chloride, lauryl trimethyl ammonium chloride, alkylbenzyl methyl ammonium chloride, alkyl benzyl dimethyl ammonium bromide, $C_{12}$ trimethyl ammonium bromide, $C_{15}$ trimethyl ammonium bromide, $C_{17}$ trimethyl ammonium bromide, dodecylbenzyl triethyl ammonium chloride, polydiallyldimethylammonium chloride, dimethylammonium chloride, alkyldimethylammonium halogenide, tricetylmethylammonium chloride, decyltrimethylammonium bromide, dodecyltriethylammonium bromide, tetradecyltrimethylammonium bromide, methyl trioctylammonium chloride, POLYQUAT 10, tetrabutylammonium bromide, benzyltrimethylammonium bromide, choline ester, benzalkonium chloride, stearalkonium chloride, cetylpyridinium bromide, cetylpyridinium chloride, a halide salt of quaternized polyoxyethylalkylamine, "MIRAPOL" (polyquaternium-2), "Alkaquat" (alkyldimethyl benzylammonium chloride, manufactured by Rhodia S.A.), an alkylpyridinium salt, amine, an amine salt, an imide azolinium salt, protonated quaternary acrylamide, a methylated quaternary polymer, and cationic guar gum, benzalkonium chloride, dodecyltrimethylammonium bromide, triethanolamine, and poloxamine.

According to the exemplary embodiment of the present specification, the size of the hollow metal particle may be adjusted by adjusting a kind of a counter ion of the surfactant forming the micelle. Specifically, as the size of the counter ion of the surfactant is increased, bonding force with a head portion of an external end of the surfactant may be weakened to increase the size of a hollow, and thus the size of the hollow metal particle may be increased.

According to the exemplary embodiment of the present specification, in the case where the surfactant is the anionic surfactant, the surfactant may include $NH_4^+$, $K^+$, $Na^+$, or $Li^+$ as the counter ion.

Specifically, in the order of the case where the counter ion of the surfactant is $NH_4^+$, the case where the counter ion of the surfactant is $K^+$, the case where the counter ion of the surfactant is $Na^+$, and the case where the counter ion of the surfactant is $Li^+$, the size of the hollow nano-particle may be reduced.

According to the exemplary embodiment of the present specification, in the case where the surfactant is the cationic surfactant, the surfactant may include $I^-$, $Br^-$, or $Cl^-$ as the counter ion.

Specifically, in the order of the case where the counter ion of the surfactant is $I^-$, the case where the counter ion of the surfactant is $Br^-$, and the case where the counter ion of the surfactant is $Cl^-$, the size of the hollow nano-particle may be reduced.

According to the exemplary embodiment of the present specification, the size of the hollow metal particle may be adjusted by adjusting the size of the head portion of the external end of the surfactant forming the micelle. Moreover, in the case where the size of the head portion of the surfactant formed on an external surface of the micelle is large, repulsive force between the head portions of the surfactant may be increased to increase the hollow, and thus the size of the hollow metal particle may be increased.

According to the exemplary embodiment of the present specification, the size of the hollow metal particle may be determined by complex action of the aforementioned elements.

According to the exemplary embodiment of the present specification, the aforementioned manufacturing method may be performed at room temperature. Specifically, the manufacturing method may be performed at a temperature in the range of 4° C. or more and 35° C. or less and more specifically 15° C. or more and 28° C. or less.

In the exemplary embodiment of the present specification, the forming of the metal shell on the surface of the micelle may be performed at room temperature, specifically the temperature in the range of 4° C. or more and 35° C. or less, and more specifically 15° C. or more and 28° C. or less. If an organic solvent is used as the solvent, manufacturing should be performed at a high temperature of more than 100° C. In the present specification, since manufacturing can be performed at room temperature, the manufacturing method is simple, and thus there is a merit in a process and a cost reduction effect is large.

In the exemplary embodiment of the present specification, the forming of the metal shell on the surface of the micelle may be performed for 30 minutes to 24 hours, more specifically 2 hours to 18 hours, and even more specifically 4 hours to 12 hours.

In the exemplary embodiment of the present specification, the reducing may be performed at room temperature, specifically the temperature in the range of 4° C. or more and 35° C. or less, and more specifically 15° C. or more and 28° C. or less.

In the present specification, since manufacturing can be performed at room temperature, the manufacturing method is simple, and thus there is a merit in a process and a cost reduction effect is large.

The reducing may be performed by reacting the first metal precursor, the second metal precursor, the third metal precursor, and the reducing agent for a predetermined time, specifically 30 minutes to 24 hours, more specifically 2 hours to 18 hours, and even more specifically 4 hours to 12 hours.

In the exemplary embodiment of the present specification, the reducing agent is not particularly limited as long as the reducing agent is a strong reducing agent having standard reduction potential of −0.23 V or less and specifically −4 V or more and −0.23 V or less and has reducing power capable of reducing dissolved metal ions to precipitate the metal ions into metal particles.

The reducing agent may be, for example, at least one selected from the group consisting of $NaBH_4$, $NH_2NH_2$, $LiAlH_4$, and $LiBEt_3H$.

In the case where a weak reducing agent is used, since there is difficulty in performing a continuous process because of a slow reaction speed and requirement of subsequent heating of the solution, there may be a problem in mass production, and particularly, in the case where ethylene glycol that is a kind of the weak reducing agent is used, productivity in a continuous process is low due to a reduction in flow speed by a high viscosity.

According to the exemplary embodiment of the present specification, in the forming of the metal shell on the surface of the micelle, the non-ionic surfactant may be further added. In the exemplary embodiment of the present specification, the non-ionic surfactant may be specifically selected from the group consisting of polyoxyethylene fatty alcohol ether, polyoxyethylene sorbitan fatty acid ester, polyoxyethylene fatty acid ester, polyoxyethylene alkyl ether, a polyoxyethylene castor oil derivative, sorbitan ester, glyceryl ester, glycerol monostearate, polyethylene glycol, polypropylene glycol, polypropylene glycol ester, cetyl alcohol, cetostearyl alcohol, stearyl alcohol, aryl alkyl polyether alcohol, a polyoxyethylenepolyoxypropylene copolymer, poloxamer, poloxamine, methyl cellulose, hydroxy cellulose, hydroxymethyl cellulose, hydroxyethyl cellulose, hydroxy propyl cellulose, hydroxy propylmethyl cellulose, hydroxypropylmethyl cellulose phthalate, amorphous cellulose, polysaccharides, starch, a starch derivative, hydroxyethyl starch, polyvinyl alcohol, triethanolamine stearate, amine oxide, dextran, glycerol, acacia gum, cholesterol, tragacanth, and polyvinylpyrrolidone.

The non-ionic surfactant is adsorbed on the surface of the shell to uniformly disperse the hollow metal particles formed in the solution. Therefore, the non-ionic surfactant may prevent precipitation by agglomeration of the hollow metal particles and form the hollow metal particles in a uniform size.

According to the exemplary embodiment of the present specification, in the forming of the metal shell on the surface of the micelle, a stabilizer may be further added.

In the exemplary embodiment of the present specification, the stabilizer may include one or two or more selected from the group consisting of specifically disodium phosphate, dipotassium phosphate, disodium citrate, trisodium citrate.

In the method of manufacturing the hollow metal particle according to the present specification, a three component system hollow metal particle having a nano size can be manufactured at room temperature on an aqueous solution by using the surfactant.

Hereinafter, the present specification will be specifically described in detail through Examples.

EXAMPLE

Example 1

$K_2PtCl_4$ as the first metal precursor, $Ni(NO_3)_2$ as the second metal precursor, $Co(NO_3)_2$ as the third metal precursor, trisodium citrate as the stabilizer, lithium dodecylsulfate (LiDS) as the anion surfactant, and dodecyltriethylammonium bromide (DTAB) as the cation surfactant were dissolved in water, and then stirred. In this case, the mole ratio of the first metal precursor, the second metal precursor, and the third metal precursor was 1:1.5:1.5, and LiDS was added at the concentration that was two times of the critical micelle concentration (CMC) to water. After agitation for 30 minutes, $NaBH_4$ that was the reducing agent was added to perform the reaction for 4 hours or more. If the reaction was finished, centrifugation was performed, and washing by water and ethanol was performed to obtain the hollow metal particle.

In this case, the average size of the hollow metal particles was 10 nm.

Example 2

In Example 1, the metal precursor was the same, LiDS was added at the concentration that was seven time of the CMC, and the reducing agent was added to perform the reaction.

Comparative Example 1

$K_2PtCl_4$ as the first metal precursor, $Ni(NO_3)_2$ as the second metal precursor, trisodium citrate as the stabilizer, lithium dodecylsulfate (LiDS) as the anion surfactant, and dodecyltriethylammonium bromide (DTAB) as the cation surfactant were dissolved in water, and then stirred. In this case, the mole ratio of the first metal precursor and the second metal precursor was 1:3, and LiDS was added at the concentration that was two times of the critical micelle concentration (CMC) to water. After stirring for 30 minutes, $NaBH_4$ that was the reducing agent was added to perform the reaction for 4 hours or more. If the reaction was finished, centrifugation was performed, and washing by water and ethanol was performed to obtain the hollow metal particle.

In this case, the average size of the hollow metal particles was 10 nm.

[Measurement of Transmission Electron Microscopy (TEM)]

A TEM picture of the hollow metal particle manufactured in Example 1 is illustrated in FIG. 1, a TEM picture of the hollow metal particle manufactured in Example 2 is illustrated in FIG. 2, and a TEM picture of the hollow metal particle manufactured in Comparative Example 1 is illustrated in FIG. 3.

[Measurement of Energy Dispersive Spectroscopy (EDS)]

An analysis result of an atomic percent of an element positioned along a line of an arrow in the hollow metal particle of FIG. 1 by an EDS line profile is illustrated in FIG. 4.

An analysis result of an atomic percent of an element positioned along a line of an arrow in the hollow metal particle of FIG. 3 by an EDS line profile is illustrated in FIG. 5.

FIG. 4 illustrates a relative content of an atom along the line represented by the arrow with respect to one of the hollow metal particles of FIG. 1 in an EDS line profile form, and Pt that is a main component is largely illustrated in a shell portion and is illustrated in small in a central portion that is a hollow.

FIG. 5 illustrates a relative content of an atom along the line represented by the arrow with respect to one of the hollow metal particles of FIG. 3 in an EDS line profile form, and Pt that is a main component is largely illustrated in a shell portion and is illustrated in small in a central portion that is a hollow.

[Measurement of Performance of Fuel Cell]

After the particles prepared in Example 1 and Comparative Example 1 were each supported in carbon (Vulcan XC-72), single cell performance of the fuel cell was evaluated under the following condition.

Cell temp: 75° C.
Anode: 100% RH $H_2$ 150 ccm
Cathode: 100% RH Air 500 ccm
Cell area: 5 $cm^2$ As a result, carbon in which the three component system hollow metal particles prepared in Example 1 were supported had activity of 0.90 $A/cm^2$ @0.6 V, and carbon in which the two component system hollow metal particles prepared in Comparative Example 1 were supported had activity of 0.81 $A/cm^2$ @0.6 V.

The invention claimed is:

1. A hollow metal particle comprising:
   a hollow core portion comprising two or more kinds of surfactant; and
   a metal shell including a first metal, a second metal, and a third metal,
   wherein the second metal and the third metal each include a metal having a standard reduction potential that is lower than a standard reduction potential of the first metal,
   wherein the surfactant includes one kind or more cation surfactants and one kind or more anion surfactants, and
   wherein a mole ratio of the cation surfactants is 0.1 or more and 0.4 or less based on a mole number of the anion surfactants.

2. The hollow metal particle of claim 1, wherein the first metal includes at least one of precious metal-based metals.

3. The hollow metal particle of claim 1, wherein the first metal includes at least one of platinum (Pt), ruthenium (Ru), rhodium (Rh), osmium (Os), iridium (Ir), palladium (Pd), gold (Au), and silver (Ag).

4. The hollow metal particle of claim 2, wherein the second metal and the third metal each include at least one of transition metals having a standard reduction potential that is lower than a standard reduction potential of the precious metal-based metals.

5. The hollow metal particle of claim 4, wherein the transition metals having the standard reduction potential that is lower than the standard reduction potential of the precious metal-based metals include nickel (Ni), cobalt (Co), iron (Fe), and copper (Cu).

6. The hollow metal particle of claim 1, wherein when a sum of mole numbers of the first metal, the second metal, and the third metal is 1, a mole ratio of the first metal is 0.6 or more and 0.9 or less.

7. The hollow metal particle of claim 1, wherein when a sum of mole numbers of the first metal, the second metal, and the third metal is 1, a mole ratio of a sum of the mole numbers of the second metal and the third metal is 0.1 or more and 0.4 or less.

8. The hollow metal particle of claim 1, wherein the first metal, the second metal, and the third metal are obtained by reducing a first metal precursor, a second metal precursor, and a third metal precursor, respectively, and a mole ratio of the first metal precursor and the second metal precursor is 1:0.5 to 3.

9. The hollow metal particle of claim 1, wherein the first metal, the second metal, and the third metal are obtained by reducing a first metal precursor, a second metal precursor, and a third metal precursor, respectively, and a mole ratio of the first metal precursor and the third metal precursor is 1:0.5 to 3.

10. The hollow metal particle of claim 1, wherein a size of the hollow metal particle is 20 nm or less.

11. An electrode catalyst comprising:
the hollow metal particle of claim 1.

12. A method of manufacturing a hollow metal particle, comprising:
forming a hollow core portion and a metal shell including a first metal, a second metal, and a third metal,
wherein the second metal and the third metal each include a metal having a standard reduction potential that is lower than a standard reduction potential of the first metal, and
wherein the metal shell including the first metal, the second metal, and the third metal is formed on a surface of a micelle formed of a surfactant by:
agitating a solution including the surfactant, a first metal precursor, a second metal precursor, a third metal precursor, and a solvent; and
adding a reducing agent to the solution to reduce the first metal precursor, the second metal precursor, and the third metal precursor.

13. The method of claim 12, wherein the solvent is water.

14. The method of claim 13, wherein in the solution, a concentration of the surfactant is 0.5 times or more and 5 times or less of a critical micelle concentration (CMC) to water.

15. The method of claim 12, wherein a mole ratio of the first metal precursor and the second metal precursor is 1:0.5 to 3.

16. The method of claim 12, wherein a mole ratio of the first metal precursor and the third metal precursor is 1:0.5 to 3.

* * * * *